United States Patent Office 2,842,599
Patented July 8, 1958

2,842,599
CAROTENOIDS AND INTERMEDIATES THEREFOR

Otto Isler, Marc Montavon, and Rudolf Rüegg, Basel, and Paul Zeller, Neuallschwil, near Basel, Switzerland, assignors to Hoffmann-La Roche Inc., Nutley, N. J., a corporation of New Jersey No Drawing. Application June 21, 1956
Serial No. 592,757

Claims priority, application Switzerland June 27, 1955

8 Claims. (Cl. 260—601)

This invention relates to novel chemical syntheses and to novel chemical compounds useful as intermediates therein. More particularly, the invention relates to novel methods for, and novel intermediates for, the preparation of certain $C_{40}$ carotenoids; especially lycopene. This compound is known in nature as the coloring principle of various plant materials. The $C_{40}$ carotenoid products produced by the processes of the invention are useful as additives to foodstuffs, in order to impart yellow to red coloration thereto.

In the following specification in those nomenclatures wherein $C_{40}$ carotenoid compounds are named by analogy to carotene as a reference structure, the numbers are applied to the forty carbon atoms of the fundamental carotenoid skeleton according to the numbering system shown in Liebigs Annalen der Chemie, volume 573, page 3 (1951), as a model. Also, the structure of organic radicals or moieties forming part of the $C_{40}$ carotenoid structure is shown diagrammatically, by skeletonized structural formulae, of the type conventional in the carotenoid art.

The invention rests upon a method for building up the $C_{40}$ structure of the desired carotenoid end products by combining two moieties, each containing ten carbon atoms, with a moiety containing twenty carbon atoms; as indicated schematically in the following flow sheet:

FLOW SHEETS (I)      Z—CH₂—Br (II)      Z—CH₂—P≡(C₆H₅)₃
               |
               Br (III)    Z—CH=P≡(C₆H₅)₃     (IV)   OHC—Q—CHO (V)      ⎡ Adduct, presumably having the formula ⎤
           ⎢ (C₆H₅)₃≡P—O    O—P≡(C₆H₅)₃ ⎥
           ⎢      |    |       |    |     ⎥
           ⎣ Z—CH—CH—Q—CH—CH—Z     ⎦

(VI)     Z—CH=CH—Q—CH=CH—Z

In the foregoing flow sheet, Z represents a monovalent radical selected from the group consisting of 2,6,6-trimethyl-1,5-hexadien-1-yl is illustrated graphically by the following skeleton formula (wherein the free valence is indicated by a broken line)

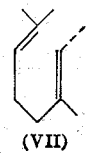

(VII)

and hydrogenated analogs thereof; and Q represents a bivalent radical selected from the group consisting of 1,5,10,14-tetramethyl - 1,3,5,7,9,11,13 - tetradecaheptaen-1,14-ylene and 1,5,10,14-tetramethyl-1,3,5,9,11,13-tetradecahexaen-7-yn-1,14-ylene as represented respectively by the following skeleton formulae (wherein the two free valences in each radical are indicated by broken lines)

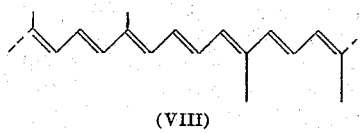

(VIII)

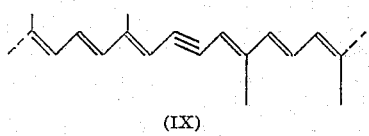

(IX)

Thus, when Q represents the radical 1,5,10,14-tetramethyl - 1,3,5,7,9,11,13-tetradecaheptaen-1,14-ylene, the $C_{20}$ dialdehyde reactant (IV), is 2,6,11,15-tetramethyl-2,4,6,8,10,12,14-hexadecaheptaene-1,16-dial; and when Q represents the radical 1,5,10,14-tetramethyl-1,3,5,9,11,13-tetradecahexaen-7-yn-1,14-ylene, the $C_{20}$ dialdehyde reactant (IV) is 2,6,11,15-tetramethyl-2,4,6,10,12,14-hexadecahexaen-8-yne-1,16-dial.

Similarly, when Z represents the radical 2,6,6-trimethyl-1,5-hexadien-1-yl, the bromo reactant (I) is 1-bromo-3,7-dimethyl-2,6-octadiene (e. g. geranyl bromide); and the product (VI) is lycopene (in the case wherein Q represents the radical 1,5,10,14-tetramethyl-1,3,5,7,9,11,13-tetradecaheptaen-1,14-ylene), and 15,15'-dehydro-lycopene (in the case wherein Q represents the radical 1,5,10,14-tetramethyl - 1,3,5,9,11,13 - tetradecahexaen-7-yn-1,14-ylene). Z can also represent a hydrogenated analog of radical (VII); e. g.

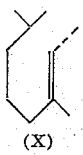

(X)

in the latter case, the bromo reactant (I) can be, for example, a dihydrogeranyl bromide.

As will be apparent from the flow sheet, the invention in a comprehensive aspect relates to a process for the preparation of a $C_{40}$ carotenoid which comprises condensing a bromo compound having the formula Z—CH₂—Br with triphenylphosphine, thereby producing a phosphonium bromide of the formula

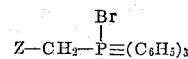

reacting the latter with phenyllithium, thereby producing a phosphine of the formula Z—CH=P≡(C₆H₅)₃; and condensing the latter with a dialdehyde having the formula OHC—Q—CHO and decomposing the resulting adduct, thereby producing a polyene compound of the formula Z—CH=CH—Q—CH=CH—Z; wherein, in the preceding formulae, the symbols Z and Q have the same meanings respectively assigned thereto above.

In the first stage of the comprehensive process shown in the flow sheet, the bromo reactant (I) is condensed with a triarylphosphine, preferably triphenylphosphine. The condensation is advantageously effected by mixing the reactants in an inert organic medium, such as benzene, until the condensation has been completed; usually after a somewhat extended reaction period of the order of

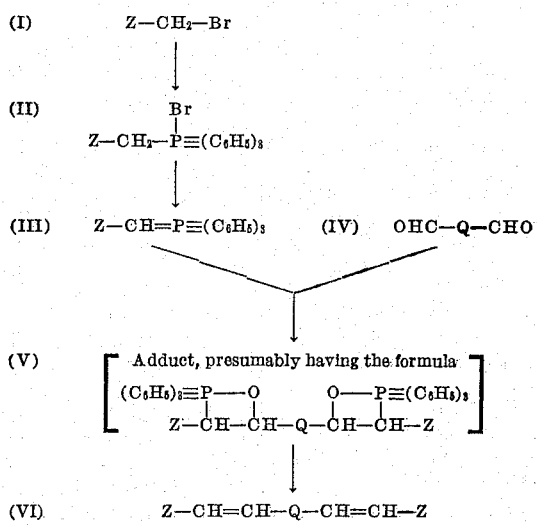

two days. Preferably, the triarylphosphine is employed in slight molar excess, in relation to the bromo reactant. At the end of the condensation reaction, the phosphonium bromide product (II) is filtered off, washed and dried.

In the next stage of the comprehensive process referred to, the phosphonium bromide intermediate (II) is treated in order to split out hydrogen bromide therefrom. This reaction is advantageously effected by suspending the intermediate (II) in an anhydrous ether, e. g. absolute diethyl ether, mixing the suspension with the stoichiometric quantity of an ethereal solution of phenyllithium or butyllithium, and heating the suspension. Upon heating, the suspended phosphonium salt goes into solution and there results a deep red- to brown-colored solution of the triarylalkylidene-phosphine (III), which solution can be used directly for the next stage of the process.

In said next stage, the solution of the phosphine compound (III) is condensed with the $C_{20}$ dialdehyde (IV); and the resulting adduct or condensation product, which probably has the formula shown at (V) in the flow sheet, is decomposed by splitting out two molar proportions of triarylphosphine oxide therefrom. An advantageous mode of effecting this stage of the process comprises mixing the dialdehyde reactant (IV) with about two molar proportions (or preferably a slight excess thereover) of the triarylalkylidene-phosphine intermediate (III), in an inert organic liquid, such as diethyl ether, petroleum ether, benzene, dioxan, tetrahydrofuran and the like. Advantageously, the reactants (III) and (IV) are mixed at room temperature or at moderately elevated temperature, taking precautions to exclude oxygen, for example by displacing the oxygen with an inert gas such as nitrogen. The condensation reaction is an exothermic reaction, which takes place practically instantaneously upon addition of a solution of the dialdehyde reactant (IV) to a solution of the phosphine reactant (III). Depending upon the specific identity and quantity of the solvent media, the adduct or condensation product (V) remains in solution or precipitates; in the latter case the color of the solution becomes lighter. In a preferred mode of execution, the dialdehyde reactant (IV), in solution in methylene chloride, is added to a suspension or solution of the phosphine reactant (III); in such manner that at least the dialdehyde reactant (IV) and the resulting adduct are both in dissolved state. The adduct decomposes, gradually if allowed to stand in solution, and more quickly if its solution is heated, resulting in the formation of the $C_{40}$ carotenoid (VI) and of triarylphosphine oxide as a byproduct. The decomposition can be effected very easily, preferably by heating the adduct, in solution in methylene chloride, for several hours at a moderately elevated temperature, e. g. 40°–50° C. At the end of the decomposition reaction, the $C_{40}$ carotenoid formed can be obtained by shaking the organic phase with water and filtering off the triarylphosphine oxide, the $C_{40}$ carotenoid being obtained by crystallisation from the filtrate, after drying and concentrating the latter. If desired, the carotenoid product can be freed of any contaminating organic phosphorus compounds by recrystallisation, partition between solvents, or chromatography. An advantageous method of purifying the $C_{40}$ carotenoid comprises mixing the filtrate, above referred to, with a large quantity of ethanol or methanol, whereupon the carotenoid precipitates in crystalline form, while the byproducts remain in solution. If the carotenoid product (VI) contains a triple bond at the 15,15' position, the latter can be partially hydrogenated and the hydrogenation product can be isomerized to the trans form by methods known per se. For example, the 15,15'-dehydro compound can be catalytically hydrogenated, in an inert solvent such as ethyl acetate, toluene or petroleum ether, in the presence of a selective hydrogenation catalyst, e. g. a palladium-lead catalyst in the presence of quinoline, of the type disclosed in the publication Helvetica Chimica Acta 35, 446 (1952). The 15,15'-cis compound formed by the hydrogenation operation can be isomerized to the corresponding trans compound by any of the known methods for effecting this type of isomerization, preferably by heating a solution of the 15,15'-cis compound.

In one of its embodiments, the invention provides a process for the preparation of lycopene which comprises condensing 1-bromo-3,7-dimethyl-2,6-octadiene with triphenylphosphine, thereby producing triphenyl-(3,7-dimethyl-2,6-octadien-1-yl)-phosphonium bromide; reacting the latter with phenyllithium, thereby producing triphenyl - (3,7 - dimethyl - 2,6 - octadien - 1 - ylidene)-phosphine; condensing the latter with 2,6,11,15-tetramethyl-2,4,6,10,12,14-hexadecahexaen-8-yne-1,16-dial and decomposing the resulting adduct, thereby producing 15,15'-dehydrolycopene; hydrogenating the latter, thereby producing 15,15'-cis-lycopene; and isomerizing the 15,15'-cis-linkage of the latter to a trans linkage.

In one of its preferred embodiments, the invention provides a process which comprises partially hydrogenating 2,6,11,15 - tetramethyl - 2,4,6,10,12,14 - hexadecahexaen-8-yne-1,16-dial, thereby producing 2,6,11,15-tetramethyl-2,4,6,8,10,12,14-hexadecaheptaene-1,16-dial; and condensing the latter with triphenyl-(3,7-dimethyl-2,6-octadien-1-ylidene)-phosphine and decomposing the resulting adduct, thereby producing all-trans-lycopene.

The invention is further illustrated by the following examples, which are illustrative but not limitative thereof. Temperatures are stated in degrees centigrade, uncorrected.

Example 1

Over a period of one hour, 217 g. of 1-bromo-3,7-dimethyl-2,6-octadiene (geranyl bromide) was added, with stirring, to a solution of 288 g. of triphenyl-phosphine in 500 ml. of benzene, at room temperature. The reaction mixture was stirred for 48 hours after all the bromo reactant had been added. The solid material formed was filtered off, washed with benzene and petroleum ether in turn, then was dried at 40° under a water pump vacuum. 100 g. of the tripenyl-(3,7-dimethyl-2,6-octadien-1-yl)-phosphonium bromide so obtained (M. P. 171°–173°), which represents a mixture of stereoisomeric products, was suspended in 100 ml. of absolute diethyl ether and reacted with a solution of 16.8 g. of phenyllithium in 400 ml. of absolute diethyl ether, by heating and stirring. The suspended material lost hydrogen bromide and dissolved to form a deep red solution of triphenyl - (3,7 - dimethyl - 2,6 - octadien - 1 - ylidene)-phosphine, which was diluted by addition of a further quantity of 700 ml. of absolute diethyl ether and used directly for the procedure described in the next paragraph.

To the deep red solution of triphenyl-(3,7-dimethyl-2,6-octadien-1-ylidene)-phosphine in 1200 ml. of absolute diethyl ether, obtained as described above, was added dropwise over a period of 5 minutes, while stirring and in a nitrogen atmosphere, a solution of 20 g. of 2,6,11,15-tetramethyl - 2,4,6,10,12,14 - hexadecahexaen - 8 - yne-1,16-dial in 500 ml. of methylene chloride. After completion of addition, the reaction mixture was stirred for a further period of 15 minutes at 30°, and was then refluxed for 5 hours. At the end of this time, 600 ml. of methanol was added to the warn reaction mixture and the latter was stirred and cooled to 10°. The crystal slurry was filtered in a carbon dioxide atmosphere, washed with 200 ml. of methanol, and dried at 50° in a high vacuum. The product, 15,15'-dehydro-lycopene, was obtained as crystals having the form of red leaflets, in a yield of 34.5 g.; M. P. 166°–168°, U. V. maxima at 452 m$\mu$ and 484 m$\mu$, $E_1$ 2420 and 2010 (in petroleum ether)

The product represents a mixture of stereoisomeric forms of 15,15'-dehydro-lycopene.

In order to convert the 15,15'-dehydro-lycopene to lycopene, 0.5 g. of the former was dissolved in 100 ml. of toluene and was hydrogenated in the presence of a palladium hydrogenation catalyst, partially inactivated with lead and quinoline (as specifically disclosed in Helvetica Chimica Acta 35, 446 (1952) at page 450), until the calculated quantity of hydrogen was taken up. The hydrogenation solution showed the cis peak at 362 m$\mu$ (in petroleum ether) characteristic of 15,15'-cis-lycopene. The catalyst was filtered off from the reaction mixture, the filtrate was concentrated, and the residue was recrystallized from high-boiling petroleum ether. During the recrystallisation, isomerization of the 15,15'-cis linkage to the trans form occurred, and the product recovered was lycopene.

The C$_{20}$ dialdehyde, 2,6,11,15-tetramethyl-2,4,6,10,12,14-hexadecahexaen-8-yne-1,16-dial, used as a reactant in this example, was prepared as follows:

10 g. of 2,7-dimethyl-2,6-octadien-4-yne-1,8-dial was dissolved in 1500 ml. of dry acetone; 150 g. of manganese dioxide (prepared according to J. Chem. Soc., 1952, 1094) was added and the mixture was shaken mechanically for 2 hours. The manganese dioxide was sucked off, washed with acetone until the filtrate ran off nearly colorless, and then the yellow acetone solution was concentrated in vacuo. Approximately 9.7 g. of a solid, yellow residue was obtained, which was recrystallized from ether/petroleum ether. The 2,7-dimethyl-2,6-octadien-4-yne-1,8-dial had M. P. 68°; ultraviolet maxima in ethanol at 314 m$\mu$ ($\epsilon$=29,000) and 330 m$\mu$ ($\epsilon$=26,200).

To a hot solution of 40 g. of 2,7-dimethyl-2,6-octadien-4-yne-1,8-dial in 120 g. of ethyl orthoformate was added to hot solution of 4 g. of ammonium nitrate in 50 ml. of absolute ethanol, and the mixture was allowed to stand for 48 hours, the mixture thus gradually reaching room temperature. Then the reaction mixture was taken up in diethyl ether, washed with dilute aqueous sodium bicarbonate solution and dried over potassium carbonate. After concentration of the ether solution, the excess of ethyl orthoformate as well as ethyl formate produced by reaction was removed from the condensation product in vacuo. By distillation in a high vacuum there was obtained pure 2,7-dimethyl-2,6-octadien-4-yne-1,8-tetraethyldiacetal, B. P. 122° to 127° at 0.03 mm.; $n_D^{24}$ 1.4892; ultraviolet maxima: 273 m$\mu$, $\epsilon$=27,200, and 288 m$\mu$, $\epsilon$=22,600 (in conc. ethanol).

To a mixture of 102 g. of 2,7-dimethyl-2,6-octadien-4-yne-1,8-tetraethyldiacetal and 0.5 ml. of boron trifluoride etherate was gradually added 47 g. of ethyl vinyl ether, while stirring. The rate of addition was so adjusted that the reaction temperature was maintained between 30° and 35°. The mixture was stirred for a further period of 3 hours at 35°, and was then taken up in diethyl ether, washed with dilute aqueous sodium hydroxide solution and dried over potassium carbonate. After concentration of the ether solution, 137 g. of crude 3,10-diethoxy-4,9-dimethyl-4,8-dodecadien-6-yne-1,12-tetraethyldiacetal was obtained. The compound, after purification by distillation in a high vacuum, had B. P. 160–161° at 0.03 mm.; $n_D^{29}$ 1.4778; ultraviolet maxima: 274 m$\mu$, $\epsilon$=26,200, and 290 m$\mu$, $\epsilon$=23,400 (in conc. ethanol).

In order to hydrolyse the above diacetal, the 137 g. of crude 3,10-diethoxy-4,9-dimethyl-4,8-dodecadien-6-yne-1,12-tetraethyldiacetal was dissolved in a mixture of 800 ml. of dioxan, 200 ml. of water and 35 ml. of syrupy phosphoric acid (containing 87% by weight H$_3$PO$_4$) and a trace of hydroquinone was added thereto. The mixture was boiled for 7 hours under a nitrogen atmosphere, during which period a mixture of dioxan, ethanol and water was slowly distilled off through a column packed with Raschig rings. The reaction volume was maintained constant by dropwise addition of a mixture of dioxan and water. The hot reaction mixture was then poured, with stirring, into 2000 ml. of ice water. Immediately 4,9-dimethyl-2,4,8,10-dodecatetraen-6-yne-1,12-dial precipitated in crystalline form. The precipitate was sucked off and washed well with water. After recrystallization from ethyl alcohol and drying in vacuo, 45 g. of the pure compound, M. P. 165° C., was obtained.

To a warm solution of 30 g. of 4,9-dimethyl-3,4,8,10-dodecatetraen-6-yne-1,12-dial in 100 g. of ethyl orthoformate was added a warm solution of 2 g. of ammonium nitrate in 100 ml. of absolute ethanol, and the mixture was heated until, on dilution, crystals of starting material no longer separated. The reaction mixture was then taken up in diethyl ether, and the solution was washed with dilute aqueous sodium bicarbonate solution and dried over potassium carbonate. After concentration of the ether solution, the excess ethyl orthoformate as well as ethyl formate formed by reaction, were separated from the reaction mixture in vacuo. The residue was distilled in a high vacuum, yielding 4,9-dimethyl-2,4,8,10-dodecatetraen-6-yne-1,12-tetraethyldiacetal, M. P. 181°/0.04 mm.; $n_D^{27}$ 1.57; ultraviolet maxima: 330 m$\mu$, $\epsilon$=46,400, and 350 m$\mu$, $\epsilon$=48,300 (in ethanol).

To 45 g. of 4,9-dimethyl-2,4,8,10-dodecatetraen-6-yne-1,12-tetraethyldiacetal and 0.5 g. of boron trifluoride etherate was added gradually, with stirring, 80 g. of ethyl propenylether. The rate of addition was so adjusted that the reaction temperature was maintained between 30° and 35°. Stirring was continued for 3 hours at 35°. Then the reaction mixture was taken up in diethyl ether, and the solution was washed with dilute aqueous sodium hydroxide solution and dried over potassium carbonate. Concentration of the ethereal solution yielded crude 3,14-diethoxy-2,6,11,15-tetramethyl-4,6,10,12-hexadecatetraen-8-yne-1,16-tetraethyldiacetal, which had two absorption maxima in the ultraviolet spectrum, at 330 m$\mu$ and 350 m$\mu$ (in ethanol).

In order to effect hydrolysis, the crude 3,14-diethoxy-2,6,11,15-tetramethyl-4,6,10,12-hexadecatetraen-8-yne-1,16-tetraethyldiacetal was dissolved in a mixture of 300 ml. of dioxan, 60 ml. of water and 10 ml. of syrupy (87%) phosphoric acid, and a small amount of hydroquinone was added. The mixture was boiled under nitrogen for 7 hours; a mixture of dioxan, alcohol and water being thus distilled off from the reaction mixture through a column packed with Raschig rings. The volume of the reaction mixture was maintained constant by dropping a mixture of dioxan and water into the reaction mixture. The hot reaction mixture was then poured into ice water, with stirring, the 2,6,11,15-tetramethyl-2,4,6,10,12,14-hexadecahexaen-8-yne-1,16-dial thus precipitating immediately in crystalline form. The precipitate was filtered with suction and thoroughly washed with water. The pure dialdehyde, having a melting point of 190° to 192°, was obtained by recrystallization from a mixture of benzene and petroleum ether.

*Example 2*

50 g. of 2,6,11,15-tetramethyl-2,4,6,10,12,14-hexadecahexaen-8-yne-1,16-dial was suspended in 600 ml. of toluene. 10 g. of a Pd-Pb-CaCO$_3$ catalyst (as specifically disclosed in Helvetica Chimica Acta 35, 446 (1952), at page 450) and 5 ml. of quinoline were added. The solution was reacted with elemental hydrogen, at room temperature and a very slight hydrogen overpressure, until the uptake of hydrogen ceased. The hydrogenation mixture was filtered, and the filter cake (containing catalyst and hydrogenation product) was washed with acetone in order to extract the hydrogenation product. The acetone solution yielded approximately 40 g. of 2,6,11,15-tetramethyl-2,4,6,8,10,12,14-hexadecaheptaene-1,16-dial, M. P. 190°–191°, ultraviolet maxima at 408, 430 and 458 m$\mu$, E$_1$ 2930, 5240 and 5820 (in petroleum ether)

To a deep red solution of triphenyl-(3,7-dimethyl-2,6-octadien-1-ylidene)-phosphine in 1200 ml. of absolute diethyl ether [obtained as described in Example 1 above from 100 g. of triphenyl-(3,7-dimethyl-2,6-octadien-1-yl)-phosphonium bromide, M. P. 171°–173°] was added dropwise, over a period of five minutes, while stirring and in a nitrogen atmosphere, a solution of 20 g. of 2,6,11,15-tetramethyl - 2,4,6,8,10,12,14-hexadecaheptaene-1,16-dial in 500 ml. of methylene chloride. The reaction mixture was stirred for an additional period of 15 minutes at 30° and then was refluxed for five hours. At the end of this time 600 ml. of methanol was added to the warm reaction mixture and the whole was cooled to 10° while stirring. The crystal slurry was filtered in a carbon dioxide atmosphere and the filter cake of crude lycopene was washed with 200 ml. of methanol. The washed material was dissolved in 300 ml. of methylene chloride, taking care that the temperature did not exceed 40°, and then was precipitated from the warm methylene chloride solution by adding thereto 500 ml. of methanol and cooling for two hours with ice water. The slurry was filtered in a carbon dioxide atmosphere, the filter cake was washed with methanol and was then dried at 40° in vacuo. There was thus obtained 25 g. of a mixture of stereoisomeric lycopenes, M. P. 152°–160°, in the form of deep red needles; U. V. maxima at 472 mμ and 504 mμ;

$E_1^1$ 3300 and 2930 (in petroleum ether)

Upon recrystallisation the melting point rose to 170°.

*Example 3*

100 g. of crude triphenyl-(3,7-dimethyl-2,6-octadien-1-yl)-phosphonium bromide of melting point 171–173° (prepared according to the procedure of Example 1) was twice boiled under reflux in 500 ml. of acetone and decanted. The insoluble material was dried at 40° in vacuo. There was obtained 60–70 g. of phosphonium bromide melting at 188–189°. This substance is believed to be the pure transform of triphenyl-(3,7-dimethyl-2,6-octadien-1-yl)-phosphonium bromide.

To the deep red solution of triphenyl-(3,7-dimethyl-2,6-octadien-1-ylidene)-phosphine in 1200 ml. of absolute diethyl ether (obtained as described above from 100 g. of triphenyl-(3,7-dimethyl - 2,6-octadien-1-yl)-phosphonium bromide, M. P. 188°–189°) was added dropwise, over a period of five minutes, while stirring and in a nitrogen atmosphere, a solution of 20 g. of 2,6,11,15-tetramethyl-2,4,6,8,10,12,14-hexadecaheptaene-1,16-dial (obtained as described in Example 2 above) in 500 ml. of methylene chloride. The reaction mixture was stirred for an additional period of 15 minutes at 30° and then was refluxed for five hours. At the end of this time 600 ml. of methanol was added to the warm reaction mixture and the whole was cooled to 10° while stirring. The crystal slurry was filtered in a carbon dioxide atmosphere and the filter cake of crude lycopene was washed with 200 ml. of methanol. The washed material was dissolved in 300 ml. of methylene chloride, taking care that the temperature did not exceed 40°, and then was precipitated from the warm methylene chloride solution by adding thereto 500 ml. of methanol and cooling for two hours with ice water. The slurry was filtered in a carbon dioxide atmosphere, the filter cake was washed with methanol and was then dried at 40° in vacuo. There was thus obtained 25 g. of all-trans-lycopene, M. P. 172°–173°, in the form of deep red needles; U. V. maxima at 446, 472 and 504 mμ;

$E_1^1$ 2250, 3450 and 3150 (in petroleum ether)

*Example 4*

To a deep red solution of triphenyl-(3,7-dimethyl-2,6-octadien-1-yliden)-phosphine in 1200 ml. of absolute diethyl ether, obtained as described in Example 3 above from 100 g. of triphenyl-(3,7-dimethyl-2,6-octadien-1-yl)-phosphonium bromide, M. P. 188°–190°, was added dropwise over a period of 5 minutes, while stirring and in a nitrogen atmosphere, a solution of 20 g. of 2,6,11,15-tetramethyl - 2,4,6,10,12,14 - hexadecahexaen-8-yne-1,16-dial in 500 ml. of methylene chloride. After completion of addition, the reaction mixture was stirred for a further period of 15 minutes at 30°, and was then refluxed for 5 hours. At the end of this time, 600 ml. of methanol was added to the warm reaction mixture and the latter was stirred and cooled to 10°. The crystal slurry was filtered in a carbon dioxide atmosphere, washed with 200 ml. of methanol, and dried at 50° in a high vacuum. There was obtained 28 g. of 15,15′-dehydro-lycopene, crystals having the form of red leaflets; M. P. 190°–192°, U. V. maxima at 453 mμ and 484 mμ, $E_1^1$ 2525 and 2165 (in petroleum ether)

In order to convert the 15,15′-dehydro-lycopene to lycopene, 0.5 g. of the former was dissolved in 100 ml. of toluene and was hydrogenated in the presence of a palladium hydrogenation catalyst, partially inactivated with lead and quinoline (as specifically disclosed in Helvetica Chimica Acta 35, 446 (1952) at page 450), until the calculated quantity of hydrogen was taken up. The hydrogenation solution showed a cis peak at 361 mμ (in petroleum ether); it contained 15,15′-mono-cis-lycopene. The catalyst was filtered off from the reaction mixture, the filtrate was concentrated, and the residue was recrystallized from high-boiling petroleum ether. During the recrystallization, isomerization of the 15,15′-cis linkage to the trans form simultaneously occurred, and the product recovered was all-trans-lycopene, identical with that obtained in Example 3 above.

*Example 5*

A solution of 50 ml. of phosphorous tribromide in 150 ml. of ether was added at 0° to a solution of 154 g. of dihydrolinalool (3,7-dimethyl-octen-1-ol-3, Helv. 23, 581 [1940] in 150 ml. of ether with stirring. After one hour at 0° the reaction mixture was poured on ice water and isolated in the usual manner. By distillation 195 g. of dihydrogeranylbromide, B. P. 52°/0.1 mm., $n_D^{24}$ 1.4752, were obtained. This product was added to a solution of 275 g. of triphenylphosphine in 1200 ml. of benzene and stirred during 3 days at room temperature. The precipitate was filtered, washed with benzene and dried at 40° in vacuo. Yield: 354 g., M. P. 185°.

To a suspension of 100 g. triphenyl-(3,7-dimethyl-2-octen-1-yl)-phosphonium-bromide, M. P. 185° in 1000 ml. of absolute diethyl ether was added dropwise, with stirring in a nitrogen atmosphere, 200 ml. of an 1 n-solution of phenyllithium in ether. To the thus obtained deep red solution of triphenyl-(3,7-dimethyl-2-octen-1-yliden)-phosphine was added a solution of 18.5 g. of 2,6,11,15 - tetramethyl - 2,4,6,8,10,12,14 - hexadecaheptaene-1,16-dial in 500 ml. of methylene chloride. After completion of addition, the reaction mixture was refluxed while stirring for a further period of 5 hours. At the end of this time, 600 ml. of methanol was added to the warm reaction mixture which then was cooled. The crystals were filtered in a carbon dioxide atmosphere, washed with methanol and dried at 50° in a high vacuum. There was obtained 10 g. of 1,2-1′,2′-tetrahydrolycopene, M. P. 178°–180°, U. V. maxima at 445, 472 and 503 mμ;

$E_1^1$ 2205, 3330 and 3000 (in petroleum ether)

We claim:

1. A compound having the formula

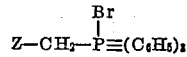

wherein Z represents a monovalent radical selected from the group consisting of 2,6,6-trimethyl-1,5-hexadien-1-yl and hydrogenated analogs thereof.

2. Triphenyl - (3,7 - dimethyl-2,6-octadien-1-yl)-phosphonium bromide.

3. A compound having the formula

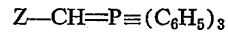

wherein Z represents a monovalent radical selected from the group consisting of 2,6,6-trimethyl-1,5-hexadien-1-yl and hydrogenated analogs thereof.

4. Triphenyl - (3,7 - dimethyl-2,6-octadien-1-ylidene)-phosphine.

5. 2,6,11,15-tetramethyl - 2,4,6,8,10,12,14 - hexadeca-heptaene-1,16-dial.

6. An adduct of a phosphine having the formula $$Z\!-\!CH\!=\!P\!\equiv\!(C_6H_5)_3$$

wherein Z represents a monovalent radical selected from the group consisting of 2,6,6-trimethyl-1,5-hexadien-1-yl and hydrogenated analogs thereof, with a dialdehyde having the formula $$OHC\!-\!Q\!-\!CHO$$

wherein Q represents a bivalent radical selected from the group consisting of 1,5,10,14-tetramethyl-1,3,5,7,9,11,13-tetradecaheptaen-1,14-ylene and 1,5,10,14-tetramethyl-1,3,5,9,11,13-tetradecahexaen-7-yn-1,14-ylene.

7. 15,15'-dehydrolycopene.

8. 1,2-1',2'-tetrahydrolycopene.

References Cited in the file of this patent

UNITED STATES PATENTS 2,676,992    Humphlett            Apr. 27, 1954

OTHER REFERENCES

Karrer et al.: Helv. Chim. Acta 28, 793–5 (1945).

Wittig et al.: Ber. Deut. Chem., vol. 87, pp. 1318–30 (1954).

Kosolapoff: "Organophosphorus Compounds," New York, New York, 1950, pages 17, 26 and 78 relied on.